US006348855B1

(12) United States Patent
Ishiguro

(10) Patent No.: US 6,348,855 B1
(45) Date of Patent: Feb. 19, 2002

(54) WIRELESS SELECTIVE CALL RECEIVER

(75) Inventor: Aki Ishiguro, Shizuoka (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 08/933,702

(22) Filed: Sep. 19, 1997

(30) Foreign Application Priority Data

Sep. 19, 1996 (JP) ............................................. 8-248215

(51) Int. Cl.[7] .................................................. H04Q 7/14
(52) U.S. Cl. ...................... 340/7.52; 340/7.55; 708/112
(58) Field of Search ....................... 340/825.44, 825.69, 340/825.72, 825.22, 825.27, 7.52, 7.85, 7.48; 455/38.3, 381, 38.2, 38.4, 456; 700/16; 705/8, 9; 708/112, 109

(56) References Cited

U.S. PATENT DOCUMENTS 4,872,005 A * 10/1989 DeLuca et al. ........ 340/825.44
5,347,269 A * 9/1994 Heuvel et al. ......... 340/825.44
5,627,525 A * 5/1997 Kudoh .................. 340/825.44
5,790,974 A * 8/1998 Tognazzini ................. 455/452

FOREIGN PATENT DOCUMENTS

| | | |
|---|---|---|
| GB | 2253501 | 9/1992 |
| JP | 59-200557 | 11/1984 |
| JP | 63-262754 | 10/1988 |
| JP | 2-43041 | 3/1990 |
| JP | 4-304039 | 10/1992 |
| JP | 7-222222 | 8/1995 |
| WO | 90/13213 | 11/1990 |

* cited by examiner

*Primary Examiner*—Edwin C. Holloway, III
(74) *Attorney, Agent, or Firm*—Ostrolenk Faber Gerb & Soffen

(57) ABSTRACT

In a selective call receiver including a display and a message memory, when receiving a message including a schedule, it is checked whether a received schedule is overlapped with a stored schedule which has been stored in the memory. When the received schedule is overlapped with the stored schedule, a prompt mark indicating duplication is displayed on screen. Depending on a user's instruction, at least one schedule is selected from the received schedule and the stored schedule. When the received schedule is selected, the received schedule is registered into the memory while deleting the stored schedule from the memory.

16 Claims, 7 Drawing Sheets

WIRELESS SELECTIVE CALL RECEIVER

BACKGROUND OF THE INVENTION

1. Field of the Invention

The present invention relates to a schedule managing and registering method in a wireless selective call receiver having a scheduler function to make it possible to retain a received message in a memory as scheduling information.

2. Description of the Related Art

There have been proposed various kinds of selective call receivers having a scheduling function in which time and date information and schedule information included in a received message are stored in memory and managed, where the time and date information specifies a time period and the schedule information shows an event to be held in the time period.

For example, in a selective call receiver disclosed in Japanese Patent Application Laid-open No. 4-304039, in the case where a schedule of time and date has been stored in memory, if time and date information in a received message coincides or overlaps with the stored schedule, the selective call receiver performs a different notice and display than normal and stores the content of the message in the memory.

However, while the conventional selective call receiver can inform a user of duplication of time and date in a schedule, the content of a received message is stored in the memory in a one-sided manner. In such a situation, an unnecessary message is stored in memory and when messages are displayed, the contents are hard to understand, and this is also an ineffective use of memory.

SUMMARY OF THE INVENTION

It is an object of the present invention to provide a selective call receiver and a schedule registering method which can effectively store and display a schedule.

It is another object of the present invention to provide a selective call receiver and a schedule managing method which can effectively use message memory.

According to an aspect of the present invention, in a wireless receiver having an input device for inputting an instruction and a memory for storing the received message, when receiving a message, the memory is searched for a stored schedule which overlaps with the received schedule. When the stored schedule is found in the memory, at least one schedule is selected from the received schedule and the stored schedule, depending on a predetermined instruction received from the input device.

According to another aspect of the present invention, it is checked whether the received schedule overlap with a stored schedule which has been stored in the memory and, when the received schedule overlaps with the stored schedule, a mark indicating duplication is displayed on screen. Subsequently, at least one schedule is selected from the received schedule and the stored schedule, depending on a predetermined instruction. When the received schedule is selected, the received schedule is registered into the memory.

BRIEF DESCRIPTION OF THE DRAWINGS

Novel features which are considered characteristic of the present invention are set forth with particularity in the appended claims.

The invention itself, however, and additional objects and advantages thereof will be best understood from the following description thereof when read in connection with accompanying drawings, in which.

DESCRIPTION OF THE PREFERRED EMBODIMENTS

Embodiments of the present invention will be described, wherein a term "schedule" is generally defined as time and date information and schedule information combined, a term "received schedule" is defined as time and date information and schedule information combined in a received message, and a term "stored schedule" is defined as time and date information and schedule information combined stored in memory.

Figure 1A:
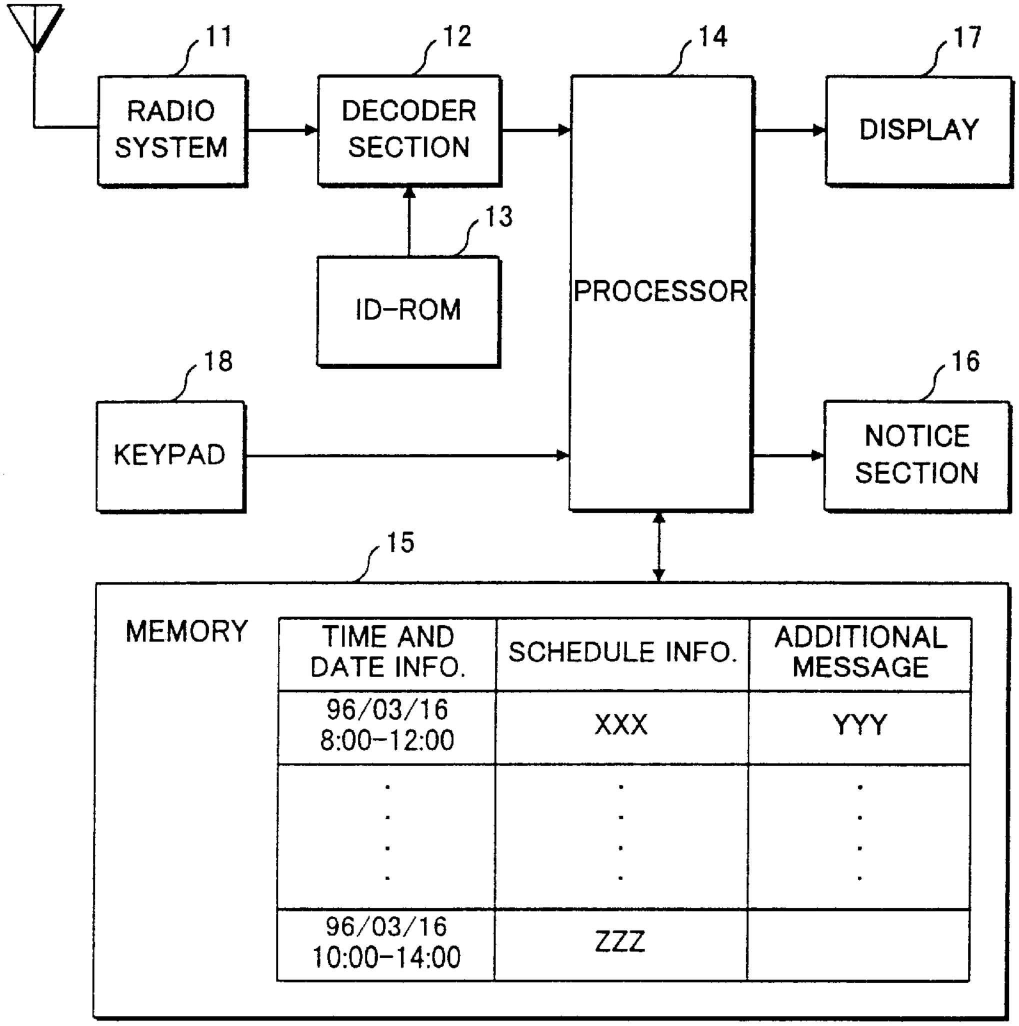
FIG. 1A is a schematic block diagram showing an embodiment of a radio selective call receiver according to the present invention.

As shown in FIG. 1A, a radio selective call receiver is provided with a radio system 11 which receives a radio selective call signal transmitted from a base station (not shown) through an antenna and demodulates it to produce a demodulated signal. A decoder section 12 compares a selective calling number included in the demodulated signal with a call number or ID stored in advance in an ID ROM 13 of the radio selective call receiver. When both numbers match, the decoder section 12 notices a processor 14 that a call has been received and at the same time sends a received message included in the demodulated signal to the processor 14. The processor 14 controls the operations in the radio selective call receiver. Under the control of the processor 14, a notice section 16 such as a sounder and a display 17 such as a liquid-crystal display are operated. A user can input desired instructions through a keypad 18.

Figure 1B:
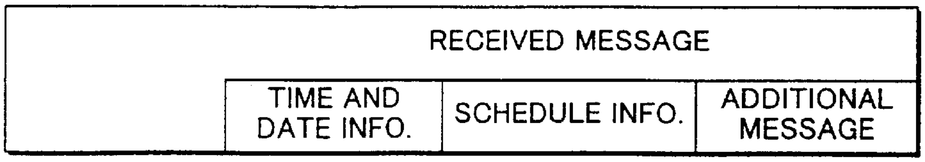
FIG. 1B is a diagram showing a format of a received message.

Referring to FIG. 1B, there is a case where a schedule is included in a received message. More specifically, such a received message includes time and date information and schedule information accompanied therewith which are followed by an additional message. The received message like this is also stored onto the memory 15 as shown in FIG. 1A. The received message and the stored messages are managed by the processor 14. The functions of the processor 14 will be described hereinafter.

(NOTICE OF CALL)

When noticed by the decoder section 12 that a call has been received, the processor 14 drives the notice section 16 to make a notice; for example, a sound is produced. A noticing means is selected from beep sound, light and vibration according to an instruction received from the keypad 18. Needless to say, it is possible to keep the notice section 16 silent even when the call is received.

(STORAGE/DISPLAY OF RECEIVED MESSAGE)

When receiving a received message from the decoder section 12, the processor 14 stores the received message onto the memory 15 according to a predetermined procedure as will be described later. The received message stored in the memory 15 can be displayed on the display 17 according to a user's instruction.

(SCHEDULER FUNCTION)

There is a case where a schedule (time and date information and schedule information accompanied therewith) is included in a received message. Such a schedule is processed by a scheduler function. In other words, the processor 14 has a management function of managing such a schedule in the memory 15, a retrieving function of deciding on whether the schedule overlaps in terms of time and/or content with a stored schedule in the memory 15 when storing the received message onto the memory 15, and a selection function of selecting one of received and stored messages depending on an user's instruction when both schedules are identical or overlapped. A detailed description will be given hereinafter.

First Embodiment

Figure 2A:
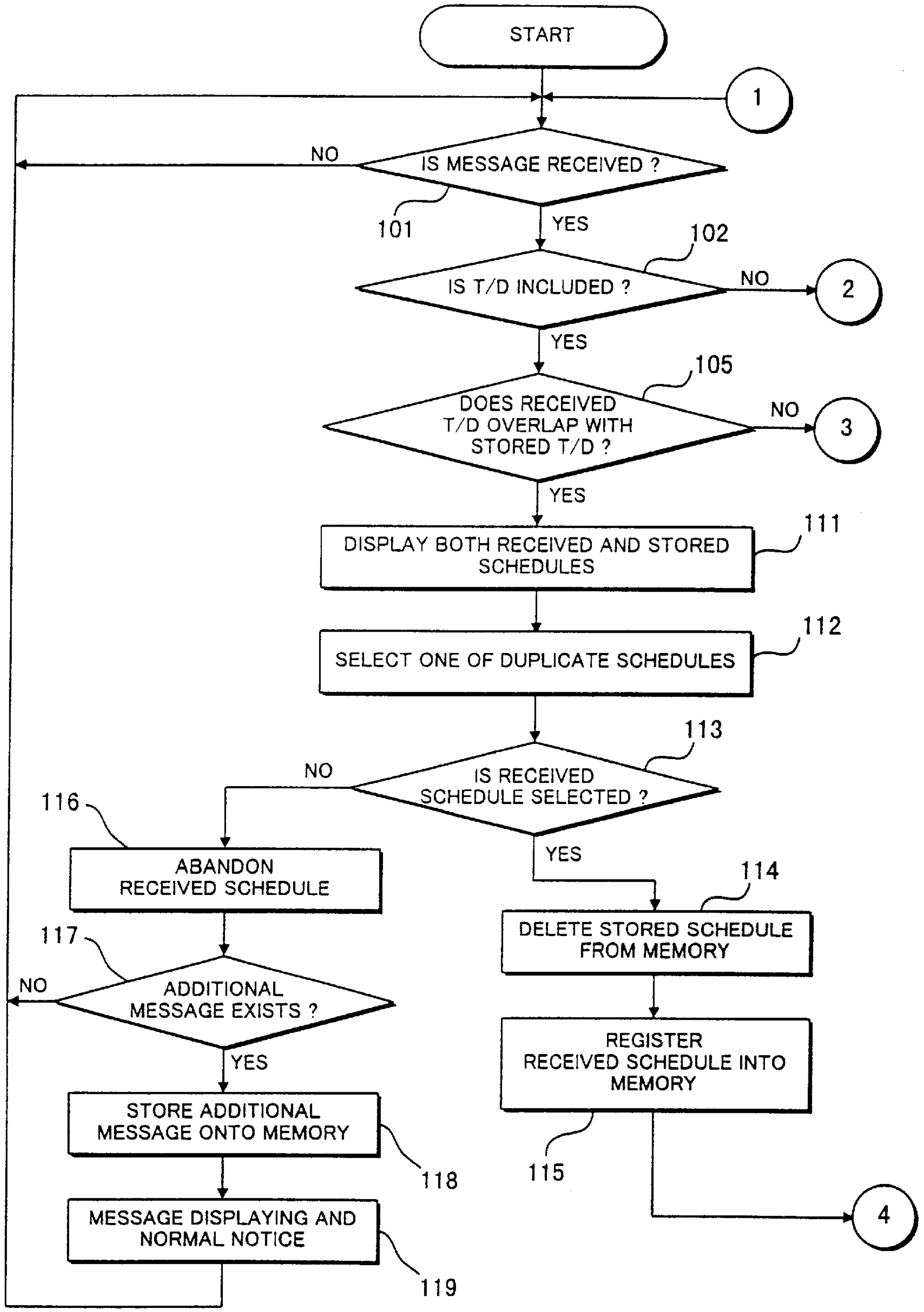
FIGS. 2A and 2B are a flow chart showing an operation of a first embodiment of a method according to the present invention.
Figure 2B:
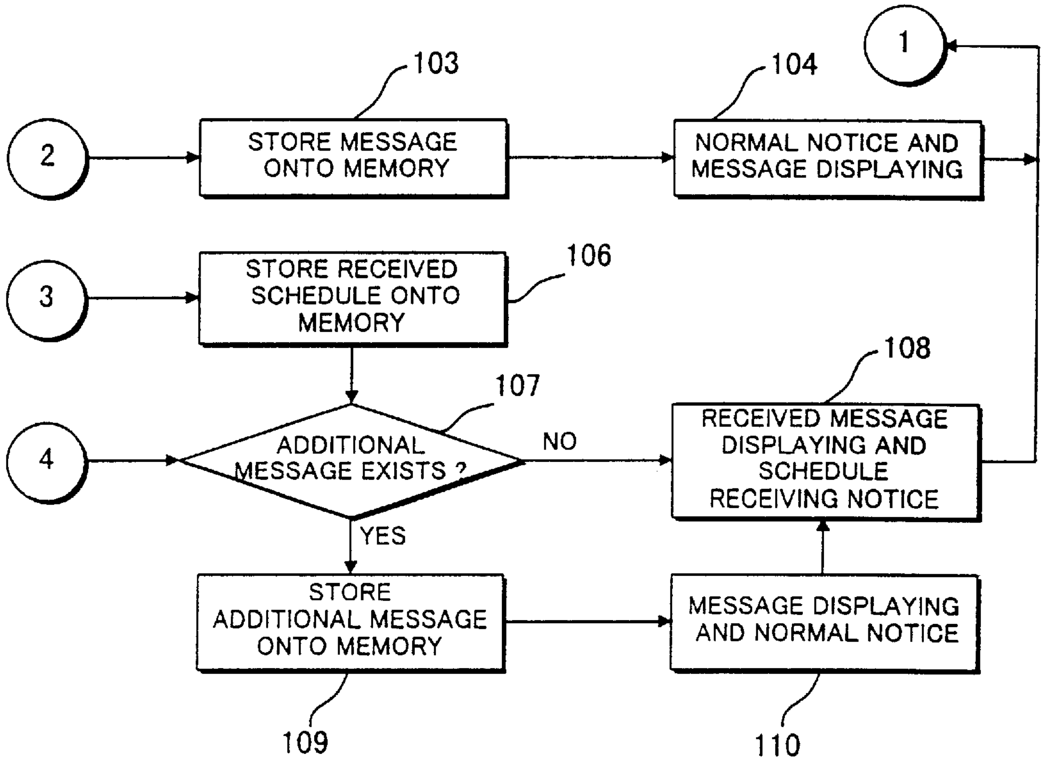
Figure 3:
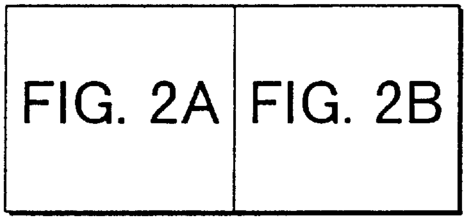
FIG. 3 is a diagram showing a combination of FIGS. 2A and 2B.

FIGS. 2A and 2B are combined as shown in FIG. 3 into a flow chart of the first embodiment. In the figures, when a message is received (YES in step 101), the processor 14 checks whether time and date information exists in the message (step 102). If time and date information does not exist (NO in step 102), the message is stored onto the memory 15 (step 103) and then the stored message is displayed and a normal notice of call is performed (step 104). After that, control goes back to the step 101, that is, the message receiving wait state.

On the other hand, if the received message includes time and date information (YES in step 102), the processor 14 searches the memory 15 for a stored schedule including time and date information (stored T/D) which is identical or overlapped with the time and date information (received T/D) in the received message (step 105). Since a scheduled time period may be partially overlapped with another, a partial matching scheme will be employed.

If a stored schedule including a stored T/D which overlaps with the received T/D is not present in the memory 15 (NO in step 105), the received schedule comprising the received T/D which may be followed by schedule information included in the received message is stored onto the memory 15 (step 106). Then, it is checked whether an additional message other than the schedule information is included in the received message (step 107). When an additional message is not present (NO in step 107), the received schedule is displayed on screen and a notice of call on the reception of a schedule is performed (step 108). After that, control goes back to the message receiving wait state (step 101).

On the other hand, if the received schedule is accompanied with an additional message other than the schedule information (YES in step 107), the additional message is stored onto the memory 15 (step 109). Then, the additional message is displayed and a normal notice of call is performed (step 110) and, in addition, the received schedule is displayed and a notice of call for reception of the schedule is performed (step 108). After that, control goes back to the message receiving wait state (step 101).

If a stored schedule including a stored T/D which overlaps with the received T/D is present in the memory 15, in other words, if the received T/D included in the received message is identical or overlaps with a stored T/D stored in the memory 15 (YES in step 105), the received schedule and the stored schedule are both displayed on screen as duplicate schedules (step 111). In this case, the whole information of each schedule may be displayed or a part thereof possible.

Figure 7A:
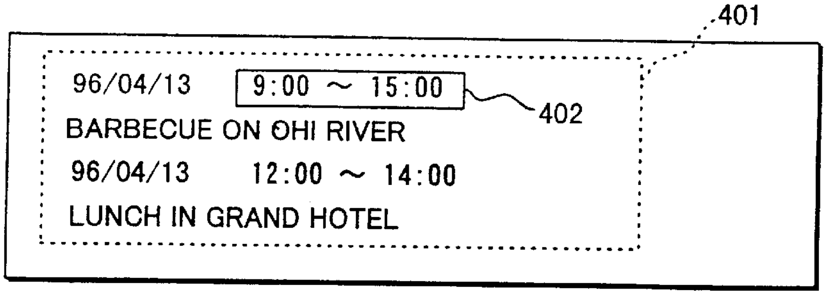
FIG. 7A is a diagram showing an example of display when selecting overlapped time and date information according to the first embodiment.

After the duplicate schedules are displayed on screen, the processor 14 prompts the user to select one of the duplicate schedules through the display 17 (step 112), which will be shown in FIG. 7A, and checks which of the received schedule and the stored schedule is selected (step 113). The selection is performed by the user depressing a selection switch or a decision switch (both not shown) included in the keypad 18.

In the case where the received schedule is selected (YES in step 113), the stored schedule which is a duplicate of the received schedule is erased from the memory 15 (step 114), and the received schedule is registered into the memory 15 (step 115). Thereafter, the steps 107 to 110 are executed as described above.

If the received schedule is not selected (NO in step 113), the received schedule is abandoned (step 116) and then it is checked whether an additional message other than the received schedule is included in the received message (step 117). If the additional message exists (YES in step 117), the additional message is stored onto the memory 15 (step 118) and then the additional message is displayed on screen and a normal notice of call is performed (step 119). Thereafter or if the additional message does not exist, control goes back to the message receiving wait state (step 101).

Figure 4A:
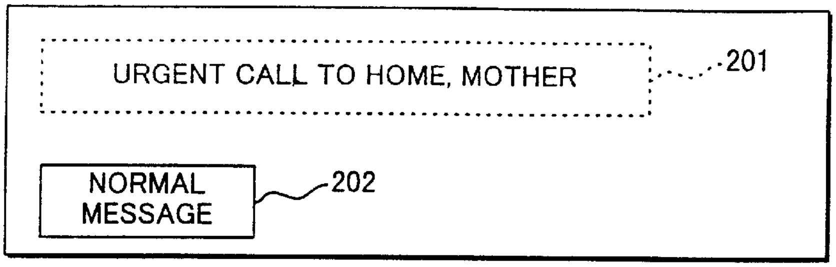
FIG. 4A is a diagram showing an example of display when the time and date information is not included according to the first embodiment.

As shown in FIG. 4A, in the case where the received message does not include time and date information, a received message as shown by a reference numeral 201 is displayed at the upper portion on screen and a normal notice of call is performed. An icon 202 displayed at the lower-left corner on screen indicates that the received message is a normal message which includes neither time and date information nor schedule information.

Figure 4B:
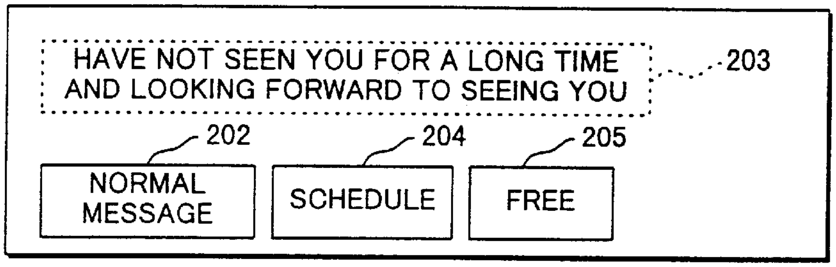
FIGS. 4B and 4C are a diagram showing an example of display when the time and date information is included without duplication according to the first embodiment.
Figure 4C:
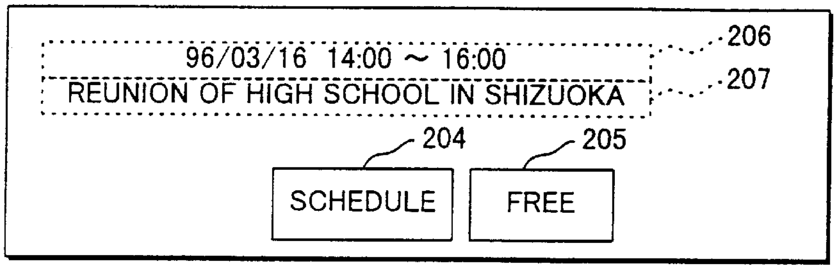

As shown in FIGS. 4B and 4C, in the case where the received message includes time and date information which does not overlap with any pieces of stored schedules in the memory 15, after a message is received, an additional message 203 is displayed on screen together with the icon 202 as well as icons 204 and 205 as shown in FIG. 4B. The icon 204 indicates that the received message includes time and date information and schedule information and the icon 205 indicates that duplicates schedules do not exist. Subsequently, if a predetermined operation on the keypad 18 is performed by the user, the display screen is changed and the time and date information 206 and the schedule information 207 are displayed on screen as shown in FIG. 4C.

Figure 4D:
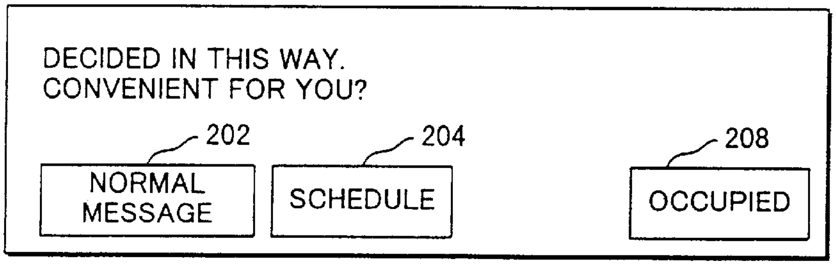
FIGS. 4D and 4E are a diagram showing an example of display when the time and date information is included with duplication according to the first embodiment.
Figure 4E:
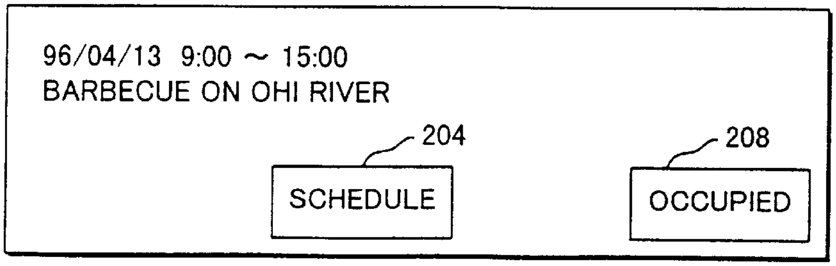

As shown in FIGS. 4D and 4E, in the case where the received message includes time and date information which overlaps with at lease one stored schedule in the memory 15, after a message is received, an additional message is displayed on screen together with the icons 202 and 204 as well as an icon 208 as shown in FIG. 4D. The icon 208 indicates that at least one duplicate schedule exists. Subsequently, if a predetermined operation on the keypad 18 is performed by the user, the display screen is changed and the time and date information and the schedule information are displayed on screen as shown in FIG. 4E.

Second Embodiment

According to the second embodiment of the present invention, in order to decide on the presence of duplicate schedules, it is checked whether schedule information included in a received message is identical or overlaps with one of pieces of schedule information stored in the memory 15. In other words, duplication is checked depending on whether both received and stored schedules are overlapped with each other in terms of content. Contrarily, in the first embodiment described above, the duplication is checked depending on whether both received and stored schedules are overlapped with each other in terms of time period. Further, in the second embodiment, the user can select both the received and stored schedules. The details will be described hereinafter.

Figure 5A:
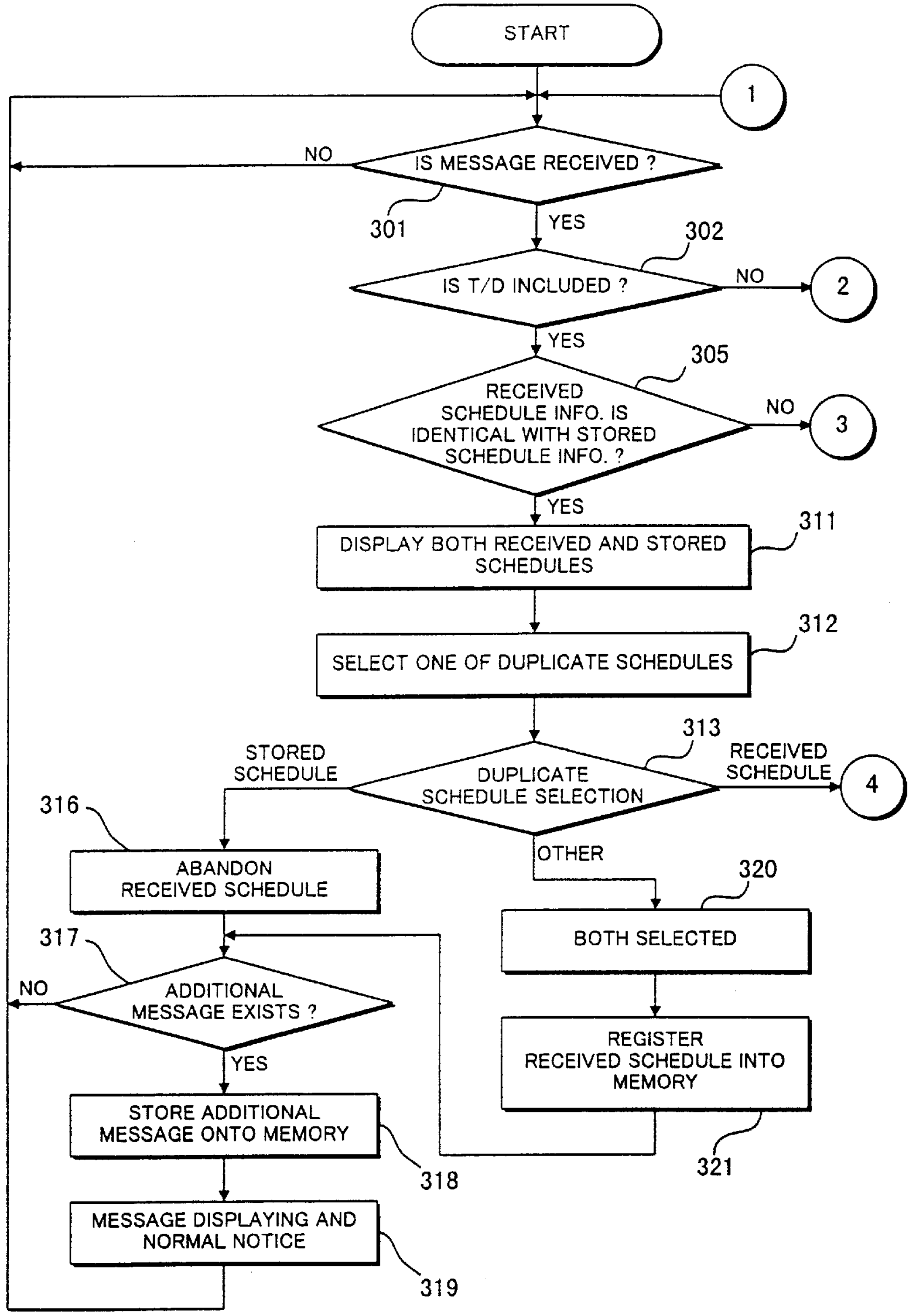
FIGS. 5A and 5B are a flow chart showing an operation of a second embodiment of a method according to the present invention.
Figure 5B:
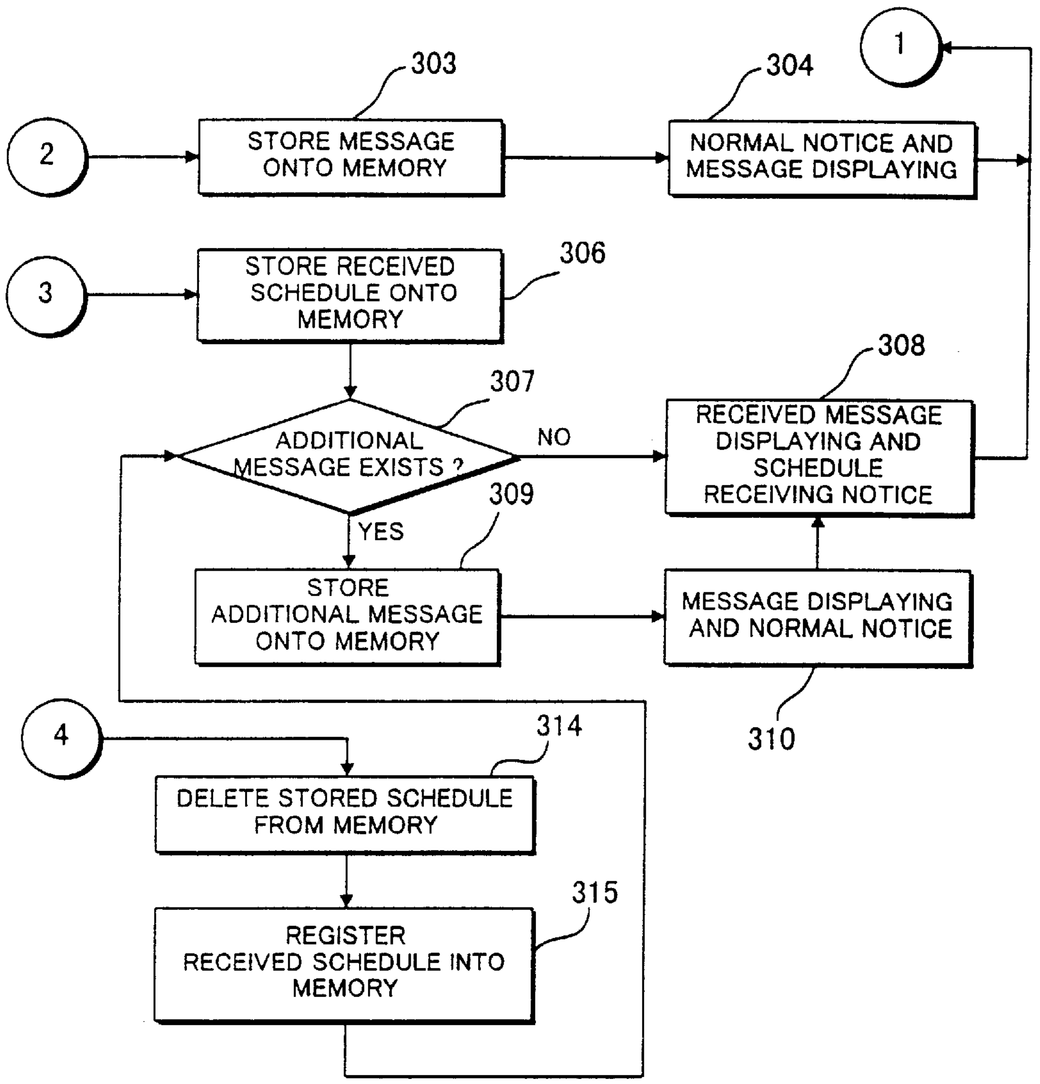
Figure 6:
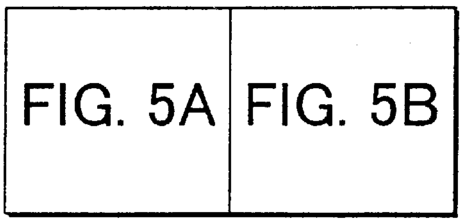
FIG. 6 is a diagram showing a combination of FIGS. 5A and 5B.

FIGS. 5A and 5B are combined as shown in FIG. 6 into a flow chart of the second embodiment. In the figures, when a message is received (YES in step 301) and time and date information does not exist (NO in step 302), the message is stored onto the memory 15 (step 303) and then the stored message is displayed and a normal notice of call is performed (step 304) as in the first embodiment.

On the other hand, if the received message includes time and date information (YES in step 302), it is checked whether there is a stored schedule including schedule information (stored schedule information) which is identical or overlapped with the schedule information included in the received message (received schedule information) in the memory 15 (step 305).

If a stored schedule including stored schedule information which is identical or overlapped with the received schedule information is not present in the memory 15 (NO in step 305), the steps 306–310 as in the case of the steps 106–110 of FIG. 2B.

If a stored schedule including stored schedule information which is identical or overlapped with the received schedule information is present in the memory 15, in other words, if the received schedule information included in the received message is identical or overlapped with a stored schedule information stored in the memory 15 (YES in step 305), the received schedule and the stored schedule are both displayed on screen as duplicate schedules (step 311).

Figure 7B:
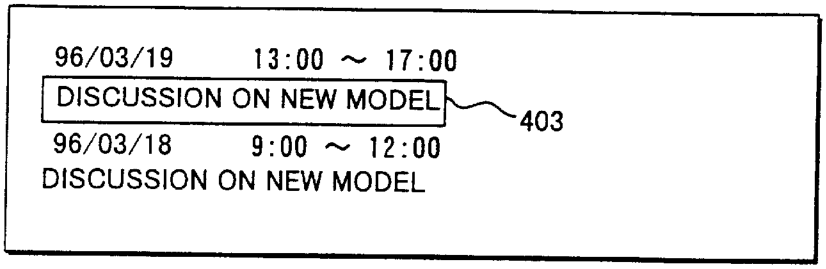
FIG. 7B is a diagram showing an example of display when selecting overlapped schedule information according to the second embodiment.

After the duplicate schedules are displayed on screen, the processor 14 prompts the user to select one or both of the duplicate schedules through the display 17 (step 312), which will be shown in FIG. 7B, and checks which of the received schedule and the stored schedule is selected (step 313).

In the case where the received schedule is selected, the steps 314–315 and 307–310 are performed as in the case of the steps 114–115 and 107–110 of the first embodiment. If the stored schedule is selected, the steps 316–319 are performed as in the case of steps 116–119 of FIG. 2A.

In the case where neither the received schedule nor the stored schedule is selected, the processor 14 decides that both schedules are selected (step 320) and stores the received schedule onto the memory (step 321). Thereafter, control goes to the step 317.

SELECTION OF DUPLICATE SCHEDULES

As shown in FIG. 7A, in the case of the first embodiment of FIGS. 2A and 2B, both the received schedule and the stored schedule which are overlapped with each other in terms of time and date information are displayed on screen as shown by a reference numeral 401. The received schedule, preferably the time information thereof, is displayed with blinking in order to prompt the user for selection as shown by a reference numeral 402. In this situation, the blinking of time information switches between the received schedule and the stored schedule each time the selection key is pushed and, when the decision key is pushed, one of the received and stored schedules is decided. The schedule which is not selected is deleted or erased as described before (steps 114 and 116 of FIG. 2A).

As shown in FIG. 7B, in the case of the second embodiment of FIGS. 5A and 5B, both the received schedule and the stored schedule which are overlapped with each other in terms of schedule information are displayed on screen. The received schedule information is displayed with blinking in order to prompt the user for selection as shown by a reference numeral 403. In this situation, the blinking of schedule information switches between the received schedule and the stored schedule each time the selection key is pushed and, when the decision key is pushed, one of the received and stored schedules is decided. The schedule which is not selected is deleted or erased as described before (steps 314 and 316). Otherwise, both of the received and stored schedules are selected and stored (steps 320 and 321).

As described above, according to a radio selective call receiver and a scheduling method of the present invention, when a message including time and date information and schedule information is received and if a stored schedule which is overlapped with the received schedule in terms of either time or content is already stored in a memory, a user is noticed of the facts and thereby the user can be informed of duplication of schedules with ease. Besides, according to the present invention, when duplicate schedules are present, the user can select and store a schedule which the user selects. Since selection on duplicate schedules is left at the user's disposal, there is another advantage that any of the duplicate schedules are not erased before the user is noticed and thereby the user can use the receiver with a sense of security.

What is claimed is:

1. A method for managing a received message including a schedule in a wireless receiver having an input device for inputting an instruction and a memory for storing the received message, comprising the steps of:

a) reading a received schedule from the received message;

b) searching the memory for a stored schedule which is overlapped with the received schedule, the stored schedule having been previously stored onto the memory;

c) if the stored schedule is found in the memory, selecting at least one of the received schedule and the stored schedule depending on a predetermined instruction received from the input device;

d) if the stored schedule is selected, abandoning the received schedule and determining whether the received message includes an additional message other than the received schedule; and e) if the received message includes the additional message, storing the additional message in the memory.

2. The method according to claim 1, further comprising the steps of:

f) if the received schedule is selected, registering the received schedule in the memory, deleting the stored schedule from the memory and determining whether the received message includes an additional message other than the received schedule; and g) if the received message includes the additional message, storing the additional message in the memory.

3. The method according to claim 2, further comprising the steps of:

when no predetermined instruction is input, registering the received schedule in the memory, and determining whether the received message includes an additional message other than the received schedule;

if the received message includes the additional message, storing the additional message in the memory.

4. The method according to claim 1, wherein the schedule includes time-and-date information, step b) comprising the steps of:

comparing received time-and-date information which is included in the received schedule with stored time-and-date information which is included in the stored schedule; and searching for the stored schedule including the stored time-and-date information which is overlapped with the received time-and-date information.

5. The method according to claim 1, wherein the schedule includes time-and-date information and event information corresponding to the time-and-date information, step b) comprising the steps of:

comparing received event information which is included in the received schedule with stored event information which is included in the stored schedule; and searching for the stored schedule including the stored event information which is overlapped with the received event information.

6. In a wireless receiver for receiving a message including a schedule, the wireless receiver comprising an input device for inputting an instruction, a display, and a memory for storing a received message, a method for managing the received message including registering a received schedule into the memory, comprising the steps of:

a) checking whether the received schedule is overlapped with a stored schedule which has been stored in the memory;

b) displaying a mark indicating duplication on screen when the received schedule is overlapped with the stored schedule;

c) selecting at least one of the received schedule and the stored schedule depending on a predetermined instruction received from the input device;

d) if the received schedule is selected, registering the received schedule into the memory and deleting the stored schedule from the memory;

e) if the stored schedule is selected, abandoning the received schedule and determining whether the received message includes an additional message other than the received schedule; and f) if the received message includes the additional message, storing the additional message in the memory.

7. The method according to claim 6, wherein the schedule includes time-and-date information, step a) comprising the steps of:

comparing received time-and-date information which is included in the received schedule with stored time-and-date information which is included in the stored schedule; and determining that the received schedule is overlapped with the stored schedule when the stored time-and-date information is overlapped with the received time-and-date information.

8. The method according to claim 6, wherein the schedule includes time-and-date information and event information corresponding to the time-and-date information, step a) comprising the steps of:

comparing received event information which is included in the received schedule with stored event information which is included in the stored schedule; and determining that the received schedule is overlapped with the stored schedule when the stored event information is overlapped with the received event information.

9. The method according to claim 6, further comprising the step of registering the received schedule when no predetermined instruction is input.

10. The method according to claim 6, further comprising the steps of:

g) if the received schedule is selected, registering the received schedule in the memory, deleting the stored schedule from the memory, and determining whether the received message includes an additional message other that the received schedule;

h) if the received message includes the additional message, storing the additional message in the memory.

11. The method according to claim 10; further comprising the steps of:

when no predetermined instruction is input, registering the received schedule in the memory, and determining whether the received message includes an additional message other than the received schedule;

if the received message includes the additional message, storing the additional message in the memory.

12. A wireless selective call receiver for receiving a message including a schedule, comprising:

an input device which receives an input instruction;

a display which displays a message depending on the instruction;

a memory which stores a received message; and a processor which searches the memory for a stored schedule which is overlapped with a received schedule included in a received message and, when the stored schedule is found, controls the display such that a selection prompt indicating duplication is displayed on screen;

wherein the processor further selects at least one of the received schedule and the stored schedule depending on a predetermined instruction input through the input device;

wherein, if the stored schedule is selected, the processor abandons the received schedule and determines whether the received message includes an additional message other that the received schedule and, if the received message includes the additional message, the processor stores the additional message in the memory.

13. The wireless selective call receiver according to claim 12, wherein the schedule includes time-and-date information and event information corresponding to the time-and-date information, wherein the processor compares received event information which is included in the received schedule with stored event information which is included in the stored schedule, and searches for the stored schedule including the stored event information which is overlapped with the received event information.

14. The wireless selective call receiver according to claim 12, wherein the schedule includes time-and-date information, wherein the processor compares received time-and-date information which is included in the received schedule with stored time-and-date information which is included in the stored schedule, and searches for the stored schedule including the stored time-and-date information which is overlapped with the received time-and-date information.

15. The wireless selective call receiver according to claim 12, wherein, if the received schedule is selected, the processor deletes the stored schedule from the memory, registers the received schedule into the memory, and determines whether the received message includes an additional message other than the received schedule, wherein, if the received message includes the additional message, the processor stores the additional message in the memory.

16. The wireless selective call receiver according to claim 15, wherein, when no predetermined instruction is input, the processor registers the received schedule, and determines whether the received message includes an additional message other than the received schedule, wherein, if the received message includes the additional message, the processor stores the additional message in the memory.

* * * * *